United States Patent [19]

Skolik et al.

[11] 4,420,075
[45] Dec. 13, 1983

[54] CONNECTING MEMBER FOR CHUTES OF CHAIN-AND-FLIGHT CONVEYORS

[75] Inventors: Wojciech Skolik; Jozef Wodecki; Zenon Gortat, all of Rybnik; Stanislaw Szyngiel, Leszczyny; Andrzej Bulenda; Piotr Sopora, both of Rybnik, all of Poland

[73] Assignee: Rybnicka Fabryka Maszyn Ryfama Przedsiebiorstwo Panstwowe, Rybnik, Poland

[21] Appl. No.: 252,510

[22] Filed: Apr. 8, 1981

[30] Foreign Application Priority Data

Apr. 10, 1980 [PL] Poland .................................. 223399

[51] Int. Cl.³ ............................................ B65G 19/28
[52] U.S. Cl. .................................. 198/735; 198/861; 403/294; 403/318
[58] Field of Search .................. 198/735, 860, 861; 403/316, 318, 292, 294, 381

[56] References Cited

U.S. PATENT DOCUMENTS

| | | | |
|---|---|---|---|
| 3,583,552 | 6/1971 | Renwick | 198/735 X |
| 3,680,682 | 8/1972 | Paul | |
| 4,098,396 | 7/1978 | Stoppani et al. | 198/735 X |
| 4,157,751 | 6/1979 | Gründken et al. | 198/735 |

FOREIGN PATENT DOCUMENTS 650898 3/1979 U.S.S.R. ............................. 198/861

302934 10/1979 U.S.S.R. ............................. 198/735

*Primary Examiner*—John J. Love
*Assistant Examiner*—Paul A. Sobel
*Attorney, Agent, or Firm*—Ladas & Parry

[57] ABSTRACT

The invention provides a reliable connection between chutes of a heavy-duty chain-and-flight conveyor with considerable side loading.

The connecting member is a shaped link, the shouldered end portions of which are coupled with the walls of the chutes to be connected with suitable yokes is characterized in that the inner flanged walls 13 and 14 of the catch 8 and securing end portion 9 of the connecting member 1, as well as the walls 15 and 16 of the yokes 2 and 3 co-operating with the latter are inclined relative to the plane 17 of the partition of the chutes 6 and 7 and convergent toward this partition plane. The catch 8 is mounted in a through hole 10 of the catch yoke 2, the strongly inclined wall 11 of the said hole 10 being so situated that it enables the catch to be introduced only in a case when the connecting member 1 has been inclined relative to the conveyor axis. The securing end portion 9 is locked in the seat 18 by means of an elastic shaped member 19 protruding toward the inclined wall 22 of the seat 18, the free dimension a of the length of the said end portion 9 together with the shaped member 19 being greater than the minimum length b of the said seat.

2 Claims, 4 Drawing Figures

CONNECTING MEMBER FOR CHUTES OF CHAIN-AND-FLIGHT CONVEYORS

BACKGROUND OF THE INVENTION

This invention relates to a connecting member for chutes of chain-and-flight conveyors, particularly those of heavy-duty type, suited to co-operation with mechanised supports provided with hydraulic power cylinders for moving gradually the chain-and-flight conveyor following the advance of the head.

The connecting members used for connecting the chutes of mining chain-and-flight conveyors so far known are built in such a way that they are provided with suitable yokes fastened to side walls of the end portions of the chutes to be connected. In the said yokes there are dismountable connectors, such as screws, bolts or special shaped connecting links. Component parts of the said connecting members are located in special recesses situated in the side walls of the said chutes and do not protrude from these recesses. This condition must be fulfilled in order to make possible the travel of a cutting machine moving along a mine head. Increased power and weight of cutting machines, as well as increased force exerted by conveyor shifters leads to ever growing demands concerning the strength of chute connections. Most durable and useful under these conditions are connections provided with shaped connecting links, such as e.g. those according to the Polish patent applications No. 194,583, published Feb. 27, 1978 corresponding to U.S. Pat. No. 4,157,751 granted June 12, 1979 where a shaped connecting link with thickened and portions on both sides has been used as a coupling member, the said thickened and portions being mounted in the pocket recessed portions of the yokes. Such a design ensures a high strength of the connection with relatively small width therof necessary in order to match the said connecting link to the grooves in the side walls of the chutes. However, the described design also has considerable disadvantages; it must ensure a convenient mounting of the end portion of connectors in the yoke seats and a reliable protections of the said connectors against disengagement. In the designs so far known, the connectors being used are provided to this aim with special protruding locking caps and splines which are, in turn, secured by means of spring clamps. Unfortunately, the above mentioned protectors protrude from the contour of the connecting yokes and rest against the outer yokes to be used for securing additional equipment of the conveyor such as gates or loading wedges.

The connections so far known have the following disadvantages: troublesome assembly of the connection, particularly as far as mounting of the shaped connecting link and its protection are concerned, a low strength of the connection of relatively short yokes with the side wall of the chute, as well as time-consuming manufacture and high production cost.

The aim of the described invention has been the elimination of the above mentioned disadvantages.

SUMMARY OF THE INVENTION

This aim has been achieved by the use of the improved connecting member of this invention. The connecting members are such that the internal transversal flanged walls of the thickened end portions of the said connecting links together with the walls of the yoke seats are inclined relative to the chute parting plane and convergent toward the chute parting zone. The convergence leads to the existence of a transversal force at the point of contact of these walls pressing the connecting link against the chute wall. One of the end portions of the connecting link has the shape of a tapered catch converging to the outside accommodated in a through hole of the catch yoke. The second end portion of the said connecting link resting in a through yoke locking seat is protected against slipping from the seat by an elastic shaped protective member mounted in the said end portion in such a way that the dimension of the free length of the said end portion together with the shaped protective member is greater than the maximum length of the said seat. This has been aimed at producing an interference fit of the end portion in the seat. The said shaped connecting link after having been introduced through the narrow inlet of the seat is expanded as a result of the inclination of the seat walls and its gradual thickening and is secured in the seat. This enables the head of the shaped member to be formed appropriately by hammering so that the pointed tip is directed toward the inclined wall of the seat. The catch yoke has a through hole accommodating the catch of the connecting link. The inner wall of the said hole co-acting with the front face of the said catch is strongly inclined outwards and situated in such a position as to enable the introduction of the catch with the position of the connecting member inclined with respect to the conveyor axis and to protect the catch against slipping out of the hole in a position when the connecting link is coupled with the locking yoke. The yoke protrudes from the chute, this protrusion being greater than the total longitudinal clearance of the connecting members in the yokes. This ensures under all circumstances proper meshing of the catch yoke with the side wall of the adjacent chute, as well as carrying of all transversal forces by this yoke. In order to make full use of the material and in order to ensure an optimum co-operation between the connecting member and the yokes, the said connecting members have a trapezoidal shape in the cross-section, the narrow base of the shank trapezium being directed towards the inside of the chutes, whereas the narrow bases of the trapezium of the catch and locking end portions are directed in the opposite direction.

The described design has the following advantages: compact design, possible manufacture of the individual component parts of the connection without the use of machining, high strength of connection, reliable operation, easy assembly and relatively low cost of production.

BRIEF DESCRIPTION OF THE DRAWINGS

The connection according to the invention has been presented on an example of embodient shown in the accompanying drawing, wherein.

DESCRIPTION OF THE PREFERRED EMBODIMENT

Figure 1:
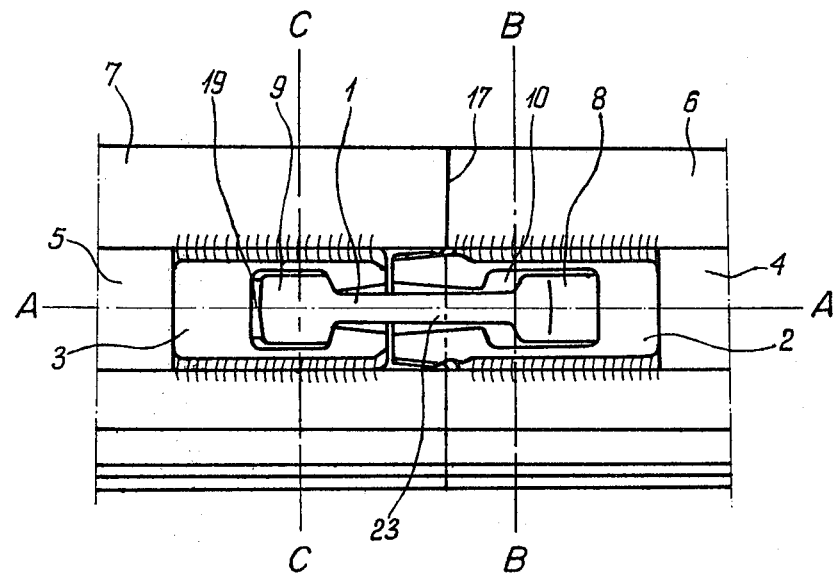
FIG. 1 presents the elevation or side view of the connection.
Figure 2:
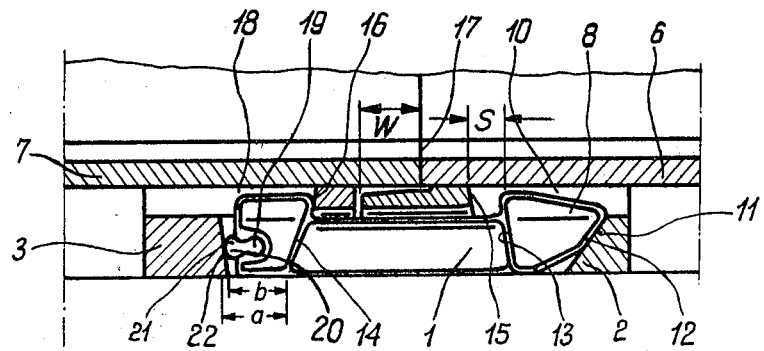
FIG. 2 shows the longitudinal view of the same, along cross-section line A—A in FIG. 1.
Figure 3:
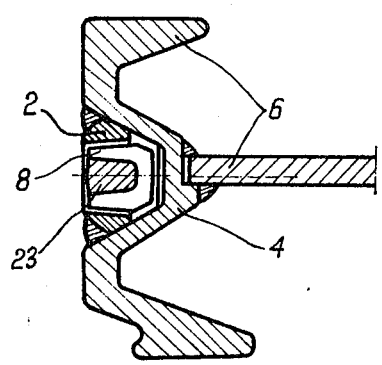
FIG. 3, shows the cross section along the line B—B of the connection shown in FIG. 1.
Figure 4:
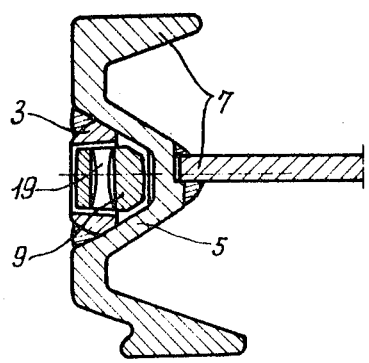
FIG. 4 presents the cross section of the connection through the locking end portion of the connecting link shown with line C—C in FIG. 1.

The connection according to the invention consists of a shaped connecting link member 1 dismountably seated in yokes 2 and 3 secured to the side walls 4 and 5 of the chutes 6 and 7 to be connected together. The said connecting link member 1 has thickened end portions on both sides, one of the said end portions being shaped so as to serve as a catch 8 and the other, as the locking end portion 9. The catch 8 is coupled with the catch yoke 2 by the location of the catch 8 in the through hole 10 of the yoke 2, the inner wall face 11 of the hole 10 co-acting with the front face 12 of the catch 8, both of which faces are strongly inclined outside the said connection and so situated as to make possible the introduction of the catch 8 with the inclined connecting member 1 and to ensure protection of the catch 8 from the hole 10 against slippage in a position, when the connecting member 1 is coupled by the locking end portion 9 with the locking yoke 3. The inner flanged walls 13 and 14 of the shoulders of the connecting member 1, as well as the walls 15 and 16 of the yokes 2 and 3 co-acting with them are inclined relative to the plane 17 of partition of the chutes 6 and 7 and convergent toward the said partition line. The locking end portion 9 of the connecting member 1, resting in the through hole 18 for securing the yode 3 is protected against slipping out of the seat 18 by means of an elastic shaped link 19 mounted in the said end portion 9 in such a way that the free dimension a of the length of the said end piece 9 together with the shaped link 19 is greater than the outside length b of the said seat 18. The said elastic shaped link 19 is expanded (force-fit) in the seat 18 of the locking yoke 3 by means of a pointed tip 20 of the head 21 formed by hammering directed toward the wall 22 of the seat 18 which is slightly inclined outwards. The shaped connecting member 1 has an approximately trapezoidal form in the cross section, the narrow base of the trapezium of the shank 23 being directed toward the inside of the chutes 6 and 7, while the trapezium of the catch 8 and locking end portion 9 are inclined in the opposite direction. The catch yoke 2 is permanently coupled with the side wall 4 of the chute 6 and protrudes toward the adjacent chute 7 through a length w which is greater than the total longitudinal clearance s of the connecting member 1 in the yokes 2 and 3.

The connecting member according to the invention can be used in mining chain-and-flight conveyors, particularly heavy-duty ones with heavily loaded conveyors.

We claim:

1. In combination, a connecting means for chutes of a mining chain and flight conveyor, comprising a locking yoke, mounted to the side wall of the end portion of one of the chutes to be connected together, and a catch yoke fixed to the side wall of the end portion of the second of the chutes to be connected and protruding towards the first chute and beyond the edge of said chute to which it is mounted, and a connecting link, said connecting link being shaped to provide on both ends respective flanged shoulders forming a catch end and a locking end, which connecting link is adapted to be placed in corresponding seats formed in said yokes, said catch yoke having a wall limiting the length of the seat for said catch end and which wall has a substantial inclination increasing the length of that seat towards its inside, said locking yoke having a wall limiting the length of the corresponding seat for said locking end and which wall has a small inclination slightly increasing the length of said seat towards its inside, part of the face portion of said catch end of the connecting link having an inclination of a selected size and convergence which corresponds to the inclination of the catch yoke wall limiting the length of the seat of the catch yoke, said locking end of the connecting link being provided with a through hole having a longitudinal axis which is parallel to the side wall of the conveyor chute, an elastic protective shaped link being mounted by a force fit in said locking end through hole, such that one end part of the elastic link is inserted in the hole while the other part, shaped in a form of hammer head, engages said wall limiting the length of locking yoke seat, the summary total outside length of said seats of the both yokes being smaller than the length of the shaped connecting member.

2. The combination according to claim 1, wherein the walls said of flanged shoulders are oblique in relation to the plane perpendicular to the side walls of the conveyor chutes, and converging with respect to said walls, the inner walls of said yoke seats cooperating with the said flanges and also oblique in the same direction.

* * * * *